US012687424B2

(12) United States Patent (10) Patent No.: US 12,687,424 B2
Giloley (45) Date of Patent: Jul. 21, 2026

(54) SELF-TARING SCALE SYSTEM

(71) Applicant: Harold Giloley, Wallingford, PA (US)

(72) Inventor: Harold Giloley, Wallingford, PA (US)

( * ) Notice: Subject to any disclaimer, the term of this patent is extended or adjusted under 35 U.S.C. 154(b) by 376 days.

(21) Appl. No.: 18/254,325

(22) PCT Filed: Nov. 24, 2021

(86) PCT No.: PCT/US2021/072604
§ 371 (c)(1),
(2) Date: May 24, 2023

(87) PCT Pub. No.: WO2022/115866
PCT Pub. Date: Jun. 2, 2022

(65) Prior Publication Data
US 2024/0003735 A1 Jan. 4, 2024

Related U.S. Application Data

(60) Provisional application No. 63/118,041, filed on Nov. 25, 2020.

(51) Int. Cl.
*G01G 23/14* (2006.01)
*G01G 19/42* (2006.01)
*G01G 23/18* (2006.01)

(52) U.S. Cl.
CPC ............. *G01G 23/14* (2013.01); *G01G 19/42* (2013.01); *G01G 23/18* (2013.01)

(58) Field of Classification Search
CPC ......... G01G 19/42; G01G 23/14; G01G 23/18
See application file for complete search history.

(56) References Cited

U.S. PATENT DOCUMENTS

| | | | |
|---|---|---|---|
| 4,047,586 A | | 9/1977 | Dlugos |
| 4,139,070 A | * | 2/1979 | Hanson ................. G01G 19/42 |
| | | | 177/25.17 |

(Continued)

FOREIGN PATENT DOCUMENTS

| | | | | |
|---|---|---|---|---|
| CN | 111238619 A | * | 6/2020 | ............. G01G 21/10 |
| CN | 111307261 A | * | 6/2020 | ............. A47B 97/00 |

OTHER PUBLICATIONS

Machine translation of CN111307261 (Year: 2020).*

(Continued)

*Primary Examiner* — Natalie Huls

(74) *Attorney, Agent, or Firm* — Kim IP Law Group LLC

(57) ABSTRACT

A self-taring scale system including a base for supporting a plurality of goods, a sensor for measuring a weight of the plurality of goods, a taring mechanism, and a processor operatively connected to the sensor and the taring mechanism. The taring mechanism includes a distractor operatively connected to the base and the sensor for moving one of the base and the sensor between a first position wherein the sensor senses the weight of the base and a second position wherein the sensor does not sense the weight of the base. The processor is configured to tare the sensor via the taring mechanism, receive a weight measurement of the plurality of goods from the sensor, and determine a count of a number of units based on a weight measurement of a unit of the plurality of goods, and the weight measurement of the plurality of goods from the sensor.

13 Claims, 6 Drawing Sheets

(56) References Cited

U.S. PATENT DOCUMENTS

| | | | | |
|---|---|---|---|---|
| 4,219,089 A | * | 8/1980 | Gard | G01G 19/42 |
| | | | | 73/862.633 |
| 4,674,060 A | | 6/1987 | Larkin et al. | |
| 4,917,198 A | * | 4/1990 | Sing | G01G 5/06 |
| | | | | 177/208 |
| 9,296,120 B2 | | 3/2016 | Mclaughlin et al. | |
| 2010/0307839 A1 | | 12/2010 | Bradley | |
| 2018/0017432 A1 | * | 1/2018 | Froehlich | G01G 21/23 |
| 2022/0023951 A1 | * | 1/2022 | Ding | G01B 11/0608 |
| 2023/0304845 A1 | * | 9/2023 | Currie | G01G 23/163 |
| 2024/0068861 A1 | * | 2/2024 | Osawa | G01G 21/283 |

OTHER PUBLICATIONS

European Patent Office, Extended European Search Report in counterpart application No. 21899267.5 mailed on Sep. 6, 2024.
International Search Report mailed Mar. 8, 2022 in International Application No. PCT/US2021/072604.
Written Opinion mailed Mar. 8, 2022 in International Application No. PCT/US2021/072604.

* cited by examiner

SELF-TARING SCALE SYSTEM

CROSS-REFERENCE TO RELATED APPLICATIONS

This application is a 35 U.S.C. § 371 National Stage of International Patent Application No. PCT/US2021/072604 filed Nov. 24, 2021, entitled "SELF-TARING SCALE SYSTEM," which claims the benefit of U.S. Provisional Patent Application No. 63/118,041, filed Nov. 25, 2020, entitled "SELF-TARING SCALE," the entire disclosures of which are hereby incorporated by reference for all purposes.

BACKGROUND OF THE DISCLOSURE

The exemplary embodiments of present invention relate generally to an electronic scale and, more specifically, to a self-taring electronic scale system.

A conventional electronic or digital scale typically comprises a base for supporting weight and a digital display for displaying the weight of object(s) supported by the base. Whereas analog scales use springs to indicate the weight of an object, digital scales convert the force of a weight to an electric signal. The key components of a digital scale consist of a strain gauge, a device used to measure the strain of an object, and load cell sensor, an electronic device used to convert a force into an electrical signal. A load cell is also known as a force transducer.

When an object is placed on the scale, the weight is first evenly distributed by, for example, four raised pegs in the corners at the bottom of the base that serve to distribute the force of the weight evenly. The digital scale then applies the force of the weight to one end of the load cell sensor. As the weight is applied, that end of the load cell sensor bends downwards. The force of the weight then deforms the strain gauge. The strain gauge can consist of metal tracks, or foil, bonded to a printed circuit board or other backing. When the metal foil is strained, the backing flexes or stretches.

The strain gauge then converts the deformation to an electrical signal. Because the load cell has an electric charge, as it moves downwards, the electrical resistance changes. The resulting small change in resistance becomes an electrical signal. The signal is run through an analog to digital converter, and then passes through a microchip that translates the data into numbers indicating the weight of the object that appear on the digital display of the scale.

Conventional digital scales are useful in weighing objects that are placed on and then removed from the scale. However, such scales are not particularly useful in an inventory control environment involving continuous monitoring of quantities of loose objects contained within bins where the objects are periodically removed from the bins. For example, if a digital scale is left on continuously and experiences a temporary power outage while weighing the loose object(s), the object(s) must be removed from the scale, the scale must be re-tared, and the object(s) placed back onto the scale. Moreover, leaving the digital scale on continuously wastes energy.

BRIEF SUMMARY OF THE DISCLOSURE

In accordance with an exemplary embodiment there is provided a self-taring scale system comprising a base for supporting a plurality of goods, a sensor for measuring a weight of the plurality of goods, a taring mechanism, and a processor operatively connected to the sensor and the taring mechanism. The taring mechanism includes a distractor operatively connected to the base and the sensor for moving one of the base and the sensor between a first position wherein the sensor senses the weight of the base and a second position wherein the sensor does not sense the weight of the base. The processor is configured to receive a weight of a unit of the plurality of goods, tare the sensor via the taring mechanism, receive a weight measurement of the plurality of goods from the sensor, and determine a count of a number of units based on the received weight measurement of a unit of the plurality of goods, and the weight measurement of the plurality of goods from the sensor.

According to an aspect, the processor is configured to execute upon powering of the self-taring scale system. According to another aspect, the processor is further configured to receive a weight of a bin, and determine a count of a number of units based on the received weight measurement of a unit of the plurality of goods, the received weight of the bin, and the weight measurement of the plurality of goods from the sensor.

According to an aspect, the processor is further configured to receive a subsequent weight measurement of the plurality of goods from the sensor when the sensor detects a change in weight the plurality of goods, and determine an updated count of a number of units based on the received weight measurement of a unit of the plurality of goods, and the subsequent weight measurement of the plurality of goods from the sensor. According to another aspect, the processor determines a count or quantity of a number of units in a container based on the mathematic quantity (weight of the plurality of goods minus a sensor tare value) divided by the weight of a unit of the plurality of goods.

According to an aspect, the self-taring scale system further comprises a memory operatively in communication with the processor for storing the weight of a unit of the plurality of goods.

According to an aspect, the distractor comprises a plurality of extendable and retractable members, and a plurality of motors each operably connected to a corresponding one of the plurality of extendable and retractable members. According to another aspect, the plurality of motors are electromechanical motors. According to another aspect, the electromechanical motors are step motors.

According to an aspect, the plurality of extendable and retractable members comprise threaded shafts. According to another aspect, each threaded shaft threadedly engages a stationary internally threaded member carried by the base. According to another aspect, a distal end of each threaded shaft engages a bearing.

According to an aspect, the self-taring scale system further comprises a plurality of pins each engaged with one of the step motors to resist rotation of the step motor and to permit axial movement of the step motor along the plurality of pins. According to another aspect, the self-taring scale system further comprises a display. According to another aspect, the self-taring scale system further comprises a communications link for transmitting a scale identifier and a combined value of a weight of the scale, the weight of the bin and the weight measurement of the plurality of goods contained in the bin to a computer. According to another aspect, the transmitter is a WiFi transmitter.

According to an aspect, there is provided display system comprising a plurality of self-taring scale systems in communication with a computer, and a display in communication with the computer, wherein the computer is configured to display on the display a count from at least one of the plurality of self-taring scale systems.

As a result of the exemplary embodiments, there is provided a self-taring scale system which at all times accurately measures the weight of a plurality of goods placed on the base of the scale system.

Other features and advantages of the subject disclosure will be apparent from the following more detailed description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Figure 1:
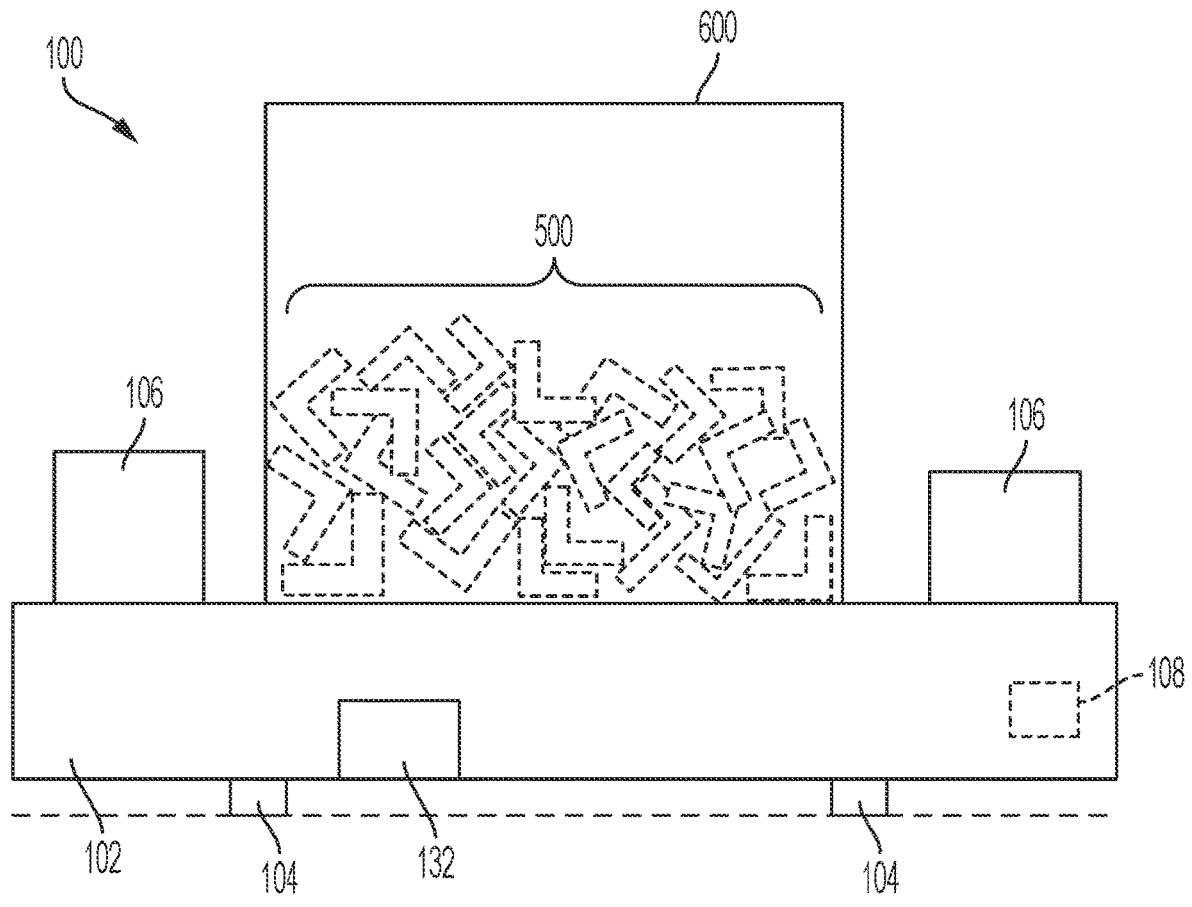
FIG. 1 is an elevational view of a self-taring scale system in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 2:
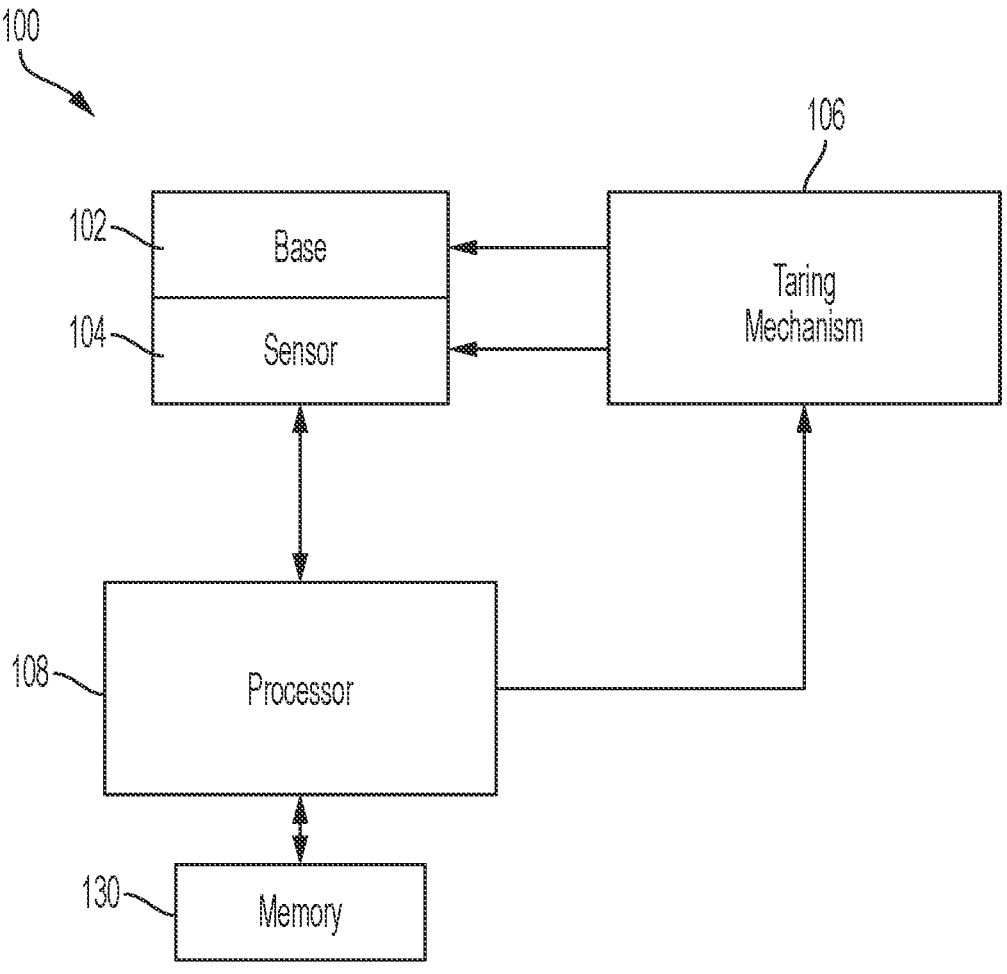
FIG. 2 is a schematic showing the relationship of certain components of the self-taring scale system of FIG. 1.

Referring now to the drawings, FIGS. 1 and 2 illustrate a self-taring scale system 100 constructed in accordance with the subject disclosure. The self-taring scale system comprises a base 102 for supporting a plurality of goods 500, a sensor 104 for measuring a weight of the plurality of goods, a taring mechanism 106, and a processor 108 operatively connected to the sensor and the taring mechanism.

Figure 7:
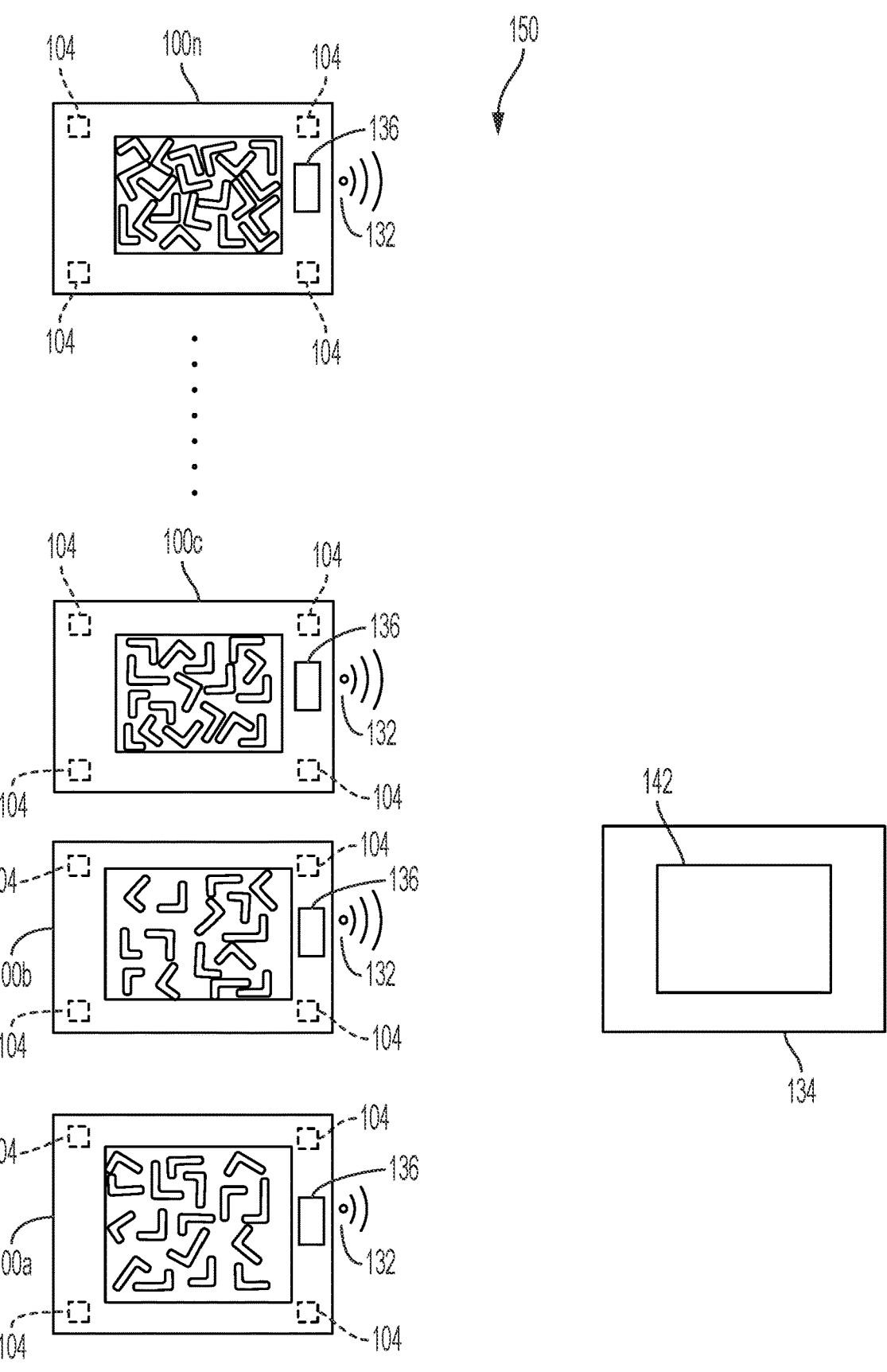
FIG. 7 is a schematic of a displaying system including a plurality of self-taring scale systems of FIG. 1 in communication with a computer which is in communication with a display.

The taring mechanism includes a distractor 110 (FIG. 3) operatively connected to the base and the sensor for moving one of the base and the sensor between a first position (FIG. 1) wherein the sensor senses the weight of the base and a second position (FIGS. 4 and 4A) wherein the sensor does not sense the weight of the base. The processor 108 is configured to receive a weight of a unit of the plurality of goods, tare the sensor via the taring mechanism, receive a weight measurement of the plurality of goods from the sensor, and determine a count of a number of units based on the received weight measurement of a unit of the plurality of goods, and the weight measurement of the plurality of goods from the sensor. In the illustrated example, the plurality of goods are shown contained in a container such as a bin 600. The bin 600 can be separate from or integral with the base 102. Alternatively, the goods can be contained in a bag which may be separate or integral with the base. The processor 108 can be on-board the self-taring scale system (FIG. 1) or contained within a computer operatively connected to the taring mechanism. Additionally, the sensor 104 may comprise a plurality of sensors, e.g., four sensors, spaced about the periphery of the base 102 for equalizing the load supported by the base (FIG. 7).

In accordance with an exemplary embodiment, the base 102 can be constructed as a substantially rigid to rigid, solid or hollow platform and may assume any shape including, without limitation, circular, square, rectangular or other polygonal shape, and is of a size sufficient to support a plurality of objects such as those contained within the bin 600. For example, the base can be 1, 2, 3, 4, 5, 8, 10, 20, 25, 30, 35, 40, 50, 60, 70, 80, 90 Or 100 square feet or more in area.

Sensor 104 can be a load cell sensor which communicates with an unillustrated strain gauge in the manner described hereinabove in connection with a conventional digital scale. The sensor can be positioned about the periphery of the base, underneath the base, or with a separate housing beneath the base.

Figure 3:
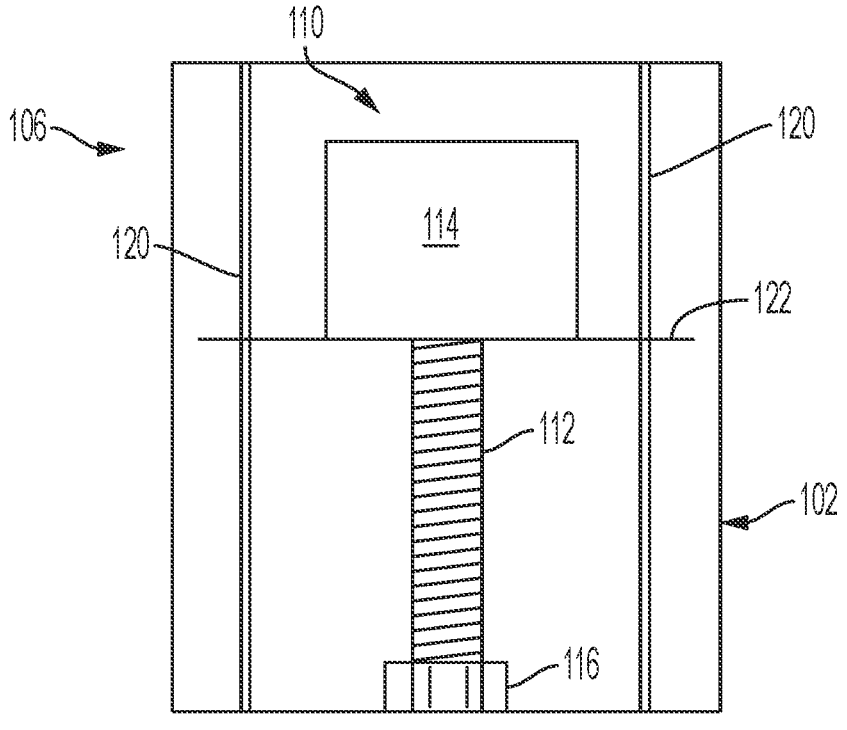
FIG. 3 is an elevational view of an exemplary taring mechanism of the self-taring scale system of FIG. 1.

The taring mechanism 106 includes the distractor 110. The distractor 110 is operatively connected to the base and the sensor for moving one of the base and the sensor between a first position wherein the sensor senses the weight of the base and a second position wherein the sensor does not sense the weight of the base. That is, as illustrated in FIGS. 3 and 4 in accordance with an exemplary embodiment, the distractor can function to lower the base such that the sensor 104 senses the weight of the base (i.e., the sensor is in contact with a surface and bears the weight of the base)

Figure 4:
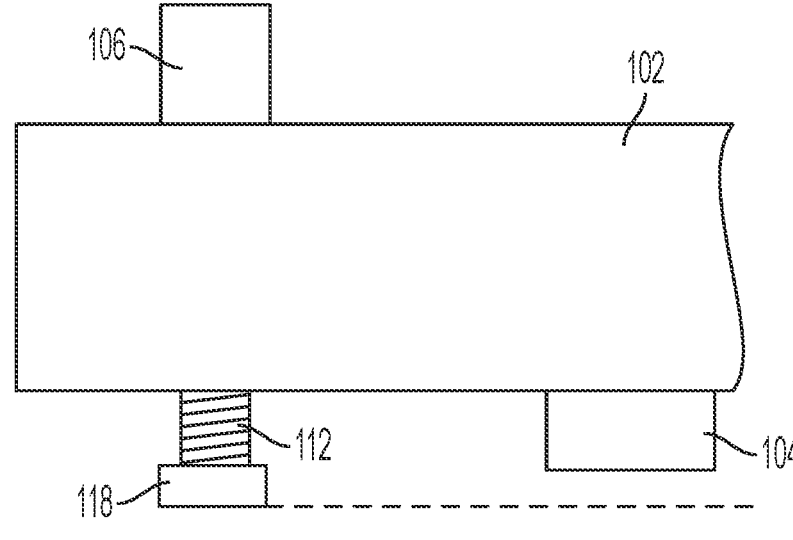
FIG. 4 is a partial view of a base and a sensor of the self-taring scale system of FIG. 1 with the sensor elevated from contact with a surface as a result of extension of the taring mechanism.

The distractor also functions to raise the base such that the sensor does not sense the weight of the base, as shown in FIG. 4. Alternatively, the base can be provided with a plurality of unillustrated stationary supports extending from a lower surface thereof, and the distractor can function to lower the sensor such that the sensor extends below the bottoms of the supports and senses the weight of the base and to raise the sensor such that the sensor does not sense the weight of the base.

The taring mechanism 106, including the distractor 110, can be integral with the base 102 or separate therefrom.

Figure 4A:
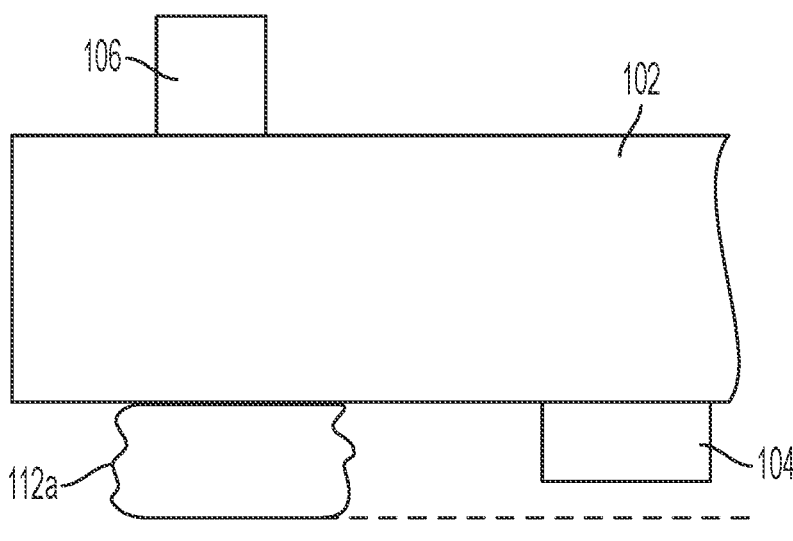
FIG. 4A is view similar to FIG. 4 of an alternative taring mechanism for use in elevating the sensor from contact with a surface.

Alternatively, as shown in FIG. 4A, the distractor can comprise one or more removable inflatable and deflatable airbags 112a selectively positionable about the periphery of the bottom of the base that can be inflated to raise the base and deflated to lower the base.

Referring back to FIGS. 3 and 4, the distractor 110 can comprise a plurality of extendable and retractable members 112 spaced apart about the periphery of the base 102, only one of which is shown in FIGS. 3 and 4. According to an aspect, the extendable and retractable members can be threaded shafts (as illustrated) or pneumatic or hydraulic cylinders, or the like. By way of illustration, but not limitation, the extendable and retractable members 112 can be 5-6 mm diameter bolts having lengths of at least 4 cm.

Further, the distractor can comprise a plurality of motors 114 (only one of which is shown in FIG. 3) each operably connected to a corresponding one of the plurality of extendable and retractable members 112. According to an aspect, the motors 114 can be electromechanical motors such as step motors (also known as stepper motors or stepping motors) for rotatably driving threaded shafts. Alternatively, the motors can be pneumatic or hydraulic motors for expanding and contracting pneumatic or hydraulic cylinders.

As shown in FIG. 3, a threaded shaft 112 threadedly engages a stationary internally threaded member 116 carried by the base. Additionally, as shown in FIG. 4, a distal end of the threaded shaft 112 engages a bearing 118 to resist rotation of the base during rotation of the threaded shaft. An internally threaded member 116 and the bearing 118 are associated with each of the plurality of threaded shafts 112. Further, as shown in FIG. 3, a plurality of pins 120 are each received in an opening of a flange 122 of one of the step motors to resist rotation of the step motor 114 and to permit axial movement of the step motor along the plurality of pins as the step motor rotates the threaded shaft into and out of the internally threaded member 116.

Figures 5, 6:
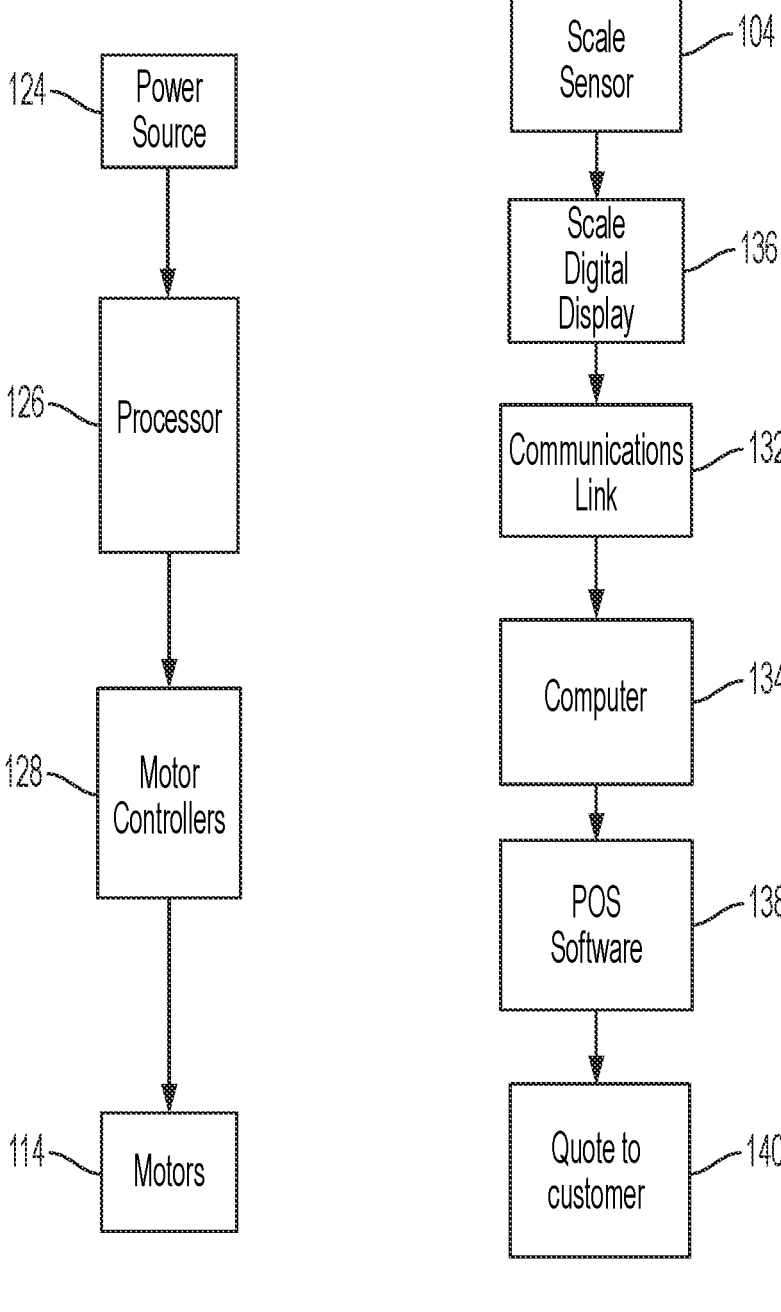
FIG. 5 is a schematic of the taring mechanism control system of the self-taring scale system of FIG. 1.
FIG. 6 is a schematic of the operation of the self-taring scale system of FIG. 1 following taring by the taring mechanism.

FIG. 5 shows an exemplary schematic diagram of how the motors 114 of the distractor are operated. An electrical power source 124 is in electrical communication with a processor 126 on which motor controller operating logic resides. The processor, in turn, is in electrical communication with a plurality of motor controllers 128 each of which is operably connected to one of a plurality of motors 114 for controlling operation of the plurality of extendable and retractable members 112. By way of illustration, but not limitation, the processor 126 can be an Arduino Uno circuit board, the motor controllers 128 can be ULN2003 driver boards, and the motors can be 28BYJ-48 reversible step motors.

The processor 108 is configured to execute upon powering of the self-taring scale system. The processor is further configured to receive a weight of the bin 600, and determine a count of a number of units based on the received weight measurement of a unit of the plurality of goods 500, the received weight of the bin, and the weight measurement of the plurality of goods from the sensor. The processor is further configured to receive a subsequent weight measurement of the plurality of goods from the sensor when the sensor detects a change in weight the plurality of goods. For example, when a unit or a number of units of goods is removed or added to the bin, the sensor senses the change following taring of the scale system. Further, the processor is configured to determine an updated count of a number of units based on the received weight measurement of a unit of the plurality of goods, and a subsequent weight measurement of the plurality of goods from the sensor.

Referring to FIG. 2, the self-taring scale further comprises a memory 130 operatively in communication with the processor 108 for storing the weight of a unit of the plurality of goods. As best shown in FIGS. 1, 6 and 7, the self-taring scale further comprises a communications link 132 for transmitting a unique scale identifier, e.g., the numeral 101, and a combined value of a weight of the scale, the weight of the bin and the weight measurement of the plurality of goods to a computer or processor 134. According to an aspect, the communications link can be a WiFi or Bluetooth transmitter and the computer is equipped with a WiFi or Bluetooth receiver. However, the communications link 132 may include any wired or wireless digital data communications link including, without limitation, a cell phone type transmitter. Optionally, the self-taring scale system 100 comprises a digital display 136 (FIG. 7) for displaying the weight supported by base 102.

As shown in FIG. 7, the subject disclosure further contemplates a displaying system 150 comprising a plurality of self-taring scale systems 100a, 100b, 100c . . . 100n in communication with the computer 134 and a display 142 in communication with the computer, wherein the computer is configured to display on the display a count from at least one of the plurality of self-taring scales.

The self-taring scale system 100 and the displaying system 150 can be effectively deployed in a variety of inventory monitoring and control applications. For instance, according to a first application, the self-taring scale 100 (including the taring mechanism) can have a weight of 10 lbs (4.54 Kg). The scale is initially at rest and weight is placed on the base 102, e.g., a bin 600 having a weight of 5 lbs (2.27 Kg) containing a plurality of goods 500 such as stainless steel elbow connectors each having a unit weight of 1 lb (0.454 Kg). At this point, software executed by the processor 108 triggers the taring mechanism 106 to start the taring process. More particularly, the motors 114 are started and turn the threaded shafts 112 in a first direction a number of rotations sufficient to move one of the base and the sensors 104 between the first position wherein the sensors sense the weight of the scale, the bin, and the plurality of goods placed in the bin and the second position wherein the sensors do not sense the weight of the scale, the bin and the plurality of goods placed in the bin. As noted above, this can also be achieved by a pneumatic, hydraulic or similar piston device. The scale is then tared while the motors 114 are paused, e.g., for 2 seconds, in the second position.

Following the pause, the motors 114 are again started and turn the threaded shafts 112 in a direction opposite the first direction until the combined weight of the scale, the bin, and the plurality of goods placed in the bin are sensed by the sensors 104. Referring to FIG. 6, if the scale is provided with a display 136, the weight of the bin and the plurality of goods placed in the bin are displayed on the display. Further, the communications link 132 transmits a unique scale identifier, e.g., the number 101, the weight of a unit of the plurality of goods, and the combined weight of the scale, the bin, and the plurality of goods placed in the bin to the computer 134. The software running on the computer 134, e.g., point of sale or "POS" software 138, stores and maps the scale identifier, the weight of a unit of the plurality of goods, and the combined weight of the scale, the bin, and the plurality of goods placed in the bin. For each scale system 100a, 100b, 100c . . . 100n in communication with the computer 134, the software compiles a data file such as, e.g., a comma separated values or CSV file comprising the scale identifier and the combined weight measurement of the scale, the container such as the bin 600 (i.e., a sensor tare value), and the weight measurement of the plurality of goods placed on the base, and displays the quantity of the plurality of goods contained in the bin based on the net or measured weight of the plurality of goods placed in the bin. For example, for scale system 100a having a scale identifier of 101, the processor or computer 134 determines a count or quantity of a number of units in a container based on the mathematic quantity (weight of the plurality of goods minus the sensor tare value) divided by the weight of a unit of the plurality of goods. The software then transmits a signal to the display 142 which displays the quantity of the plurality of goods contained in the bin. In the present example, the software may arrive at a net goods weight measurement of 45 lbs (20.41 Kg) or a quantity 45 units of goods in the bin. If the desired quantity to be maintained in the bin is, for example, 50 units, then the POS software issues a sales quote to a customer, identified by reference numeral 140 in FIG. 6, indicating a suggested quantity of goods, e.g., 30 units, that would be needed to restore the number of units in the bin to the desired quantity plus a surplus sufficient to replenish goods as they are taken from the bin. This process can occur daily or more or less frequently as the customer's needs may dictate. If the customer takes no action or objection, the system can be configured to automatically order and ship the suggested quantity of goods to the customer with their next order.

Significantly, the self-taring scale system is deactivated after the transmitter 132 transmits the scale identifier, the weight of a unit of the plurality of goods, and the combined weight of the scale, the bin, and the plurality of goods placed in the bin to the computer 134. As a consequence, less power is used by the scale than if it were continuously activated and power outages that could deleteriously affect the performance of continuously activated scales is avoided.

An alternative application of the system can be for inventory control of sensitive or expensive items. For example, a police station may have an ammunition storage room accessible through a single door by officers or other personnel having specified unique identifiers. The ammunition room may have multiple self-taring scale systems similar to scale systems 100a, 100b, 100c . . . 100n of FIG. 7 supporting bins of various calibers of bullets or other ammunition. In a typical situation, an officer having a unique identifier, e.g., numeral 456, enters the room, takes a supply of needed ammunition, and leaves the room. At this point, the scale systems can be triggered to activate and count the remaining inventory in the entire room. This would be useful for reordering ammunition as needed, as well as provide a reliable history of what ammunition was removed, and by whom. Deploying one or more cameras in the ammunition room may be useful in assuring that the officer taking the ammunition is the same as the officer identified by the unique identifier.

In another exemplary alternative application, the system may be deployed to assure that proper replacement parts are used with sensitive or expensive equipment. For example, if an employee having a unique identifier, e.g., numeral 789, is supposed to be working on a specific plasma cutter having a unique identifier, e.g., numeral 123, and takes bearings from a bin that do not fit the plasma cutter, a manager may receive an alert that the employee may be installing the wrong part.

In another exemplary alternative application, the system may be deployed in moving environments where vibration is an issue, such as in a work van or a tow-behind trailer. In this example, the self-taring scale system begins at rest, with the weight of the scale (including the taring mechanism) being borne entirely on the plurality of extendable and retractable members 112 of the distractor 110, i.e., no weight is on the scale sensors 104. Software executed by the processor 108 then triggers the taring mechanism motors 114 to operate the extendable and retractable members 112 to lower the base 102 until all the scale weight is on the sensors. The scale is then tared while the motors 114 are paused, e.g., for 2 seconds. Thereafter, weight is added to the base which turns on the scale and the combined weight of the scale and the weight added to the base is transmitted to the processor 134. Software executed by the processor 108 then triggers the taring mechanism motors 114 to operate the extendable and retractable members 112 to raise the platform 102 until all of the scale weight and the weight on the base is removed from the sensors 104 and placed entirely on the plurality of extendable and retractable members 112, i.e, the rest state.

An advantage of the present system is that customers and employees may retrieve the goods they need to perform a task without having to scan or record the retrieved goods. A further advantage is that the system remains inactive until software triggers the taring mechanism to activate. As a consequence, less energy is required to operate the system and power outages do not affect the system as they would a continuously activated system.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

I claim:

1. A self-taring scale system comprising a base for supporting a plurality of goods and a sensor for measuring a weight of the plurality of goods, comprising:

a taring mechanism that includes a distractor operatively connected to the base and the sensor for moving one of the base and the sensor between a first position wherein the sensor is in contact with a surface and senses the weight of the base and a second position wherein the sensor is out of contact with the surface and does not sense the weight of the base, wherein the distractor comprises:

a plurality of extendable and retractable members; and a plurality of step motors each operably connected to a corresponding one of the plurality of extendable and retractable members for extending and retracting same;

a processor operatively connected to the sensor and the taring mechanism, the processor configured to:

receive a weight of a unit of the plurality of goods, tare the sensor via the taring mechanism, receive a weight measurement of the plurality of goods from the sensor, and determine a count of a number of units based on the received weight measurement of a unit of the plurality of goods, and the weight measurement of the plurality of goods from the sensor, and a plurality of pins each engaged with one of the step motors to resist rotation of the step motor and to permit axial movement of the step motor along the plurality of pins.

2. The self-taring scale system of claim 1, wherein the processor is configured to execute upon powering of the self-taring scale system.

3. The self-taring scale system of claim 1, wherein the processor is further configured to receive a weight of a bin, and determine a count of a number of units based on the received weight measurement of a unit of the plurality of goods, the received weight of the bin, and the weight measurement of the plurality of goods from the sensor.

4. The self-taring scale system of claim 3, further comprising a communications link for transmitting a unique scale identifier and a combined value of a weight of the scale, the weight of the bin and the weight measurement of the plurality of goods contained in the bin to a computer.

5. The self-taring scale system of claim 4, wherein the communications link is a WiFi transmitter.

6. The self-taring scale system of claim 1, wherein the processor is further configured to:

receive a subsequent weight measurement of the plurality of goods from the sensor when the sensor detects a change in weight the plurality of goods; and determine an updated count of a number of units based on the received weight measurement of a unit of the plurality of goods, and the subsequent weight measurement of the plurality of goods from the sensor.

7. The self-taring scale system of claim 1, further comprising a memory operatively in communication with the processor for storing the weight of a unit of the plurality of goods.

8. The self-taring scale system of claim 1, wherein the plurality of extendable and retractable members comprise threaded shafts.

9. The self-taring scale system of claim 8, wherein each threaded shaft threadedly engages a stationary internally threaded member carried by the base.

10. The self-taring scale system of claim 8, wherein a distal end of each threaded shaft engages a bearing.

11. The self-taring scale system of claim 1, further comprising a display.

12. The self-taring scale system of claim 1, wherein the processor is configured to determine a count of a number of units based on the mathematic quantity (weight of the plurality of goods minus a sensor tare value) divided by the weight of a unit of the plurality of goods.

13. A displaying system comprising:

a plurality of self-taring scale systems according to claim 1 in communication with a computer; and a display in communication with the computer, wherein the computer is configured to display on the display a count from at least one of the plurality of self-taring scale systems.

* * * * *